US006808056B2

(12) United States Patent
Neu et al.

(10) Patent No.: US 6,808,056 B2
(45) Date of Patent: Oct. 26, 2004

(54) STOP APPARATUS AND METHOD FOR GEAR ACTUATORS

(75) Inventors: Steven K. Neu, Paynesville, MN (US); James E. Barker, Sauk Rapids, MN (US)

(73) Assignee: SPX Corporation, Charlotte, NC (US)

( * ) Notice: Subject to any disclaimer, the term of this patent is extended or adjusted under 35 U.S.C. 154(b) by 104 days.

(21) Appl. No.: 10/210,037

(22) Filed: Aug. 2, 2002

(65) Prior Publication Data

US 2004/0021116 A1 Feb. 5, 2004

(51) Int. Cl.$^7$ .......................... F16D 71/04; F16K 51/00
(52) U.S. Cl. ..................... 192/141; 70/177; 70/180; 74/89.37; 251/288
(58) Field of Search .................. 192/141, 139, 192/138; 74/89.37, 89.39; 70/177, 180, 183, 232; 251/248, 264, 288, 60; 137/556.3

(56) References Cited

U.S. PATENT DOCUMENTS

| 1,993,784 A | * | 3/1935 | Henderson ................. 70/180 |
| 2,020,181 A | * | 11/1935 | Hayner ..................... 251/264 |
| 2,063,442 A | * | 12/1936 | Kriege ....................... 70/180 |
| 2,316,956 A | * | 4/1943 | Eugene ....................... 70/180 |
| 2,460,222 A | * | 1/1949 | Hall, Jr. ..................... 74/89.37 |
| 2,462,809 A | * | 2/1949 | De Craene ................. 74/89.39 |
| 3,327,826 A | * | 6/1967 | Henschke ................... 192/141 |
| 3,650,156 A | * | 3/1972 | Thomas ..................... 192/141 |
| 4,064,981 A | * | 12/1977 | House et al. ............... 192/141 |
| 4,479,397 A | * | 10/1984 | Jelinek et al. ............. 74/89.37 |
| 5,215,112 A | * | 6/1993 | Davison ..................... 70/177 |
| 6,079,442 A | * | 6/2000 | Raymond et al. .......... 251/248 |

OTHER PUBLICATIONS

Valve Actuator with Memory Stop Mechanism (4 pages of drawings) Mastergear 11447 Second St. Roscoe, IL 61073.

* cited by examiner

Primary Examiner—Rodney H. Bonck
(74) Attorney, Agent, or Firm—Baker & Hostetler LLP

(57) ABSTRACT

A stop apparatus for a gear actuator includes a traveling stop nut that has adjustable positions and travels on a screw on an input shaft. The stop nut is mounted to threadably travel on the stop screw. A stop guide is attached to the stop screw and prevents rotation of the stop screw relative to the gear actuator and permits longitudinal travel of the stop screw during rotation of the input shaft. The stop nut abuts a stop surface upon a predremined amount of rotation of the input shaft to prevent further rotations.

16 Claims, 4 Drawing Sheets

STOP APPARATUS AND METHOD FOR GEAR ACTUATORS

FIELD OF THE INVENTION

The invention pertains to the field of providing a stop apparatus and method for gear actuators, including for example gear actuators that are used to rotate a valve between open and closed positions. Such stops may be used to define a particular stop point beyond which the valve member cannot be moved.

BACKGROUND OF THE INVENTION

Gear actuators are in wide use in many applications such as commercial industrial applications. In particular, gear actuators having an input shaft are used to drive a rotary valve member within a valve body.

In some applications, the drive assembly will have a reduction gear so that several turns of the input shaft will rotate the output shaft at a slower speed. The drive assembly also sometimes contains some form of rotary indicator, which may rotate with the output shaft, on the outside of the housing of the drive assembly. The indicator indicates a relative rotary position of the output shaft. Since the output shaft is attached to the rotary valve member, the indicator can show the relative position of the valve member in the valve body.

In many circumstances, such as for example, in the case of plug valves, butterfly valves and ball valves, the valve member is rotatable through a angular range from fully opened to fully closed positions. Often, this range is approximately 90 degrees of rotation.

Sometimes it is desirable to provide some form of stop arrangement that will stop the movement of the valve member in one or the other directions of travel. For example, it may be desirable to provide a stop that prevents the valve from being opened past a predetermined partially open position.

A variety of stop mechanisms that are attached to the actuator are known. Some of these are adjustable to some degree. For example, it has been known to provide a cam type member mounted to the output shaft that rotates with the output shaft and stops the output shaft when it abuts against a pin extending from the housing. The relative angular position of the cam member can be adjusted, sometimes in incremental steps.

Another approach to adjustment has been to incorporate parts having matched teeth so that the teeth can be matched at angular intervals. However, these devices may require a screw or other device to compress the two parts together.

The approaches described above are relatively complex and also suffer the disadvantage that the stop is directly connected to the output shaft.

A further disadvantage of these arrangement is that the stop must withstand the maximum output actuator torque rating. The output torque in a reducing gear actuator will be greater than the input torque, and hence it would be desirable to have a stop that can conveniently be used on the input shaft side of the gear actuator. Further, it would be desirable to have a stop that requires a minimum number of parts, and one that can be easily retrofitted to existing gear actuators.

SUMMARY OF THE INVENTION

It is therefore a feature and advantage of the present invention to provide a convenient and effective stop assembly and method for gear actuators. The above and other features and advantages are achieved through the use of a novel stop assembly and method as herein disclosed.

In accordance with one embodiment of the present invention, a stop apparatus is provided for use with a gear actuator has an input shaft and an output shaft. The stop apparatus has a stop screw mounted to rotate with the input shaft. The stop apparatus also has a stop nut mounted to threadably travel on the stop screw, and a stop guide attached to the stop screw that prevents rotation of the stop screw relative to the gear actuator and permits longitudinal travel of the stop screw during rotation of the input shaft.

In accordance with another embodiment of the present invention, a stop apparatus is provided for use with a gear actuator having an input shaft and an output shaft. The stop apparatus has a first engaging means mounted to rotate with the input shaft. The stop apparatus also has a second engaging and traveling means mounted for engaging the first engaging means and traveling on the stop screw. Guiding means is attached to the first engaging means for guiding the second engaging means. The guiding means prevents rotation of the second engaging means relative to the gear actuator and permits longitudinal travel of the stop screw during rotation of the input shaft.

In accordance with yet another embodiment of the present invention, a method for stopping a gear actuator output shaft is provided. The method includes steps of rotating an input shaft to cause a nut to travel thereon; preventing rotation of the nut relative to the input shaft; and contacting the nut with a stop surface at a predetermined degree of rotation of the input shaft.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

FIGS. 1–5 illustrate presently preferred embodiments of the present invention, in which like numerals refer to like parts throughout.

Figure 1:
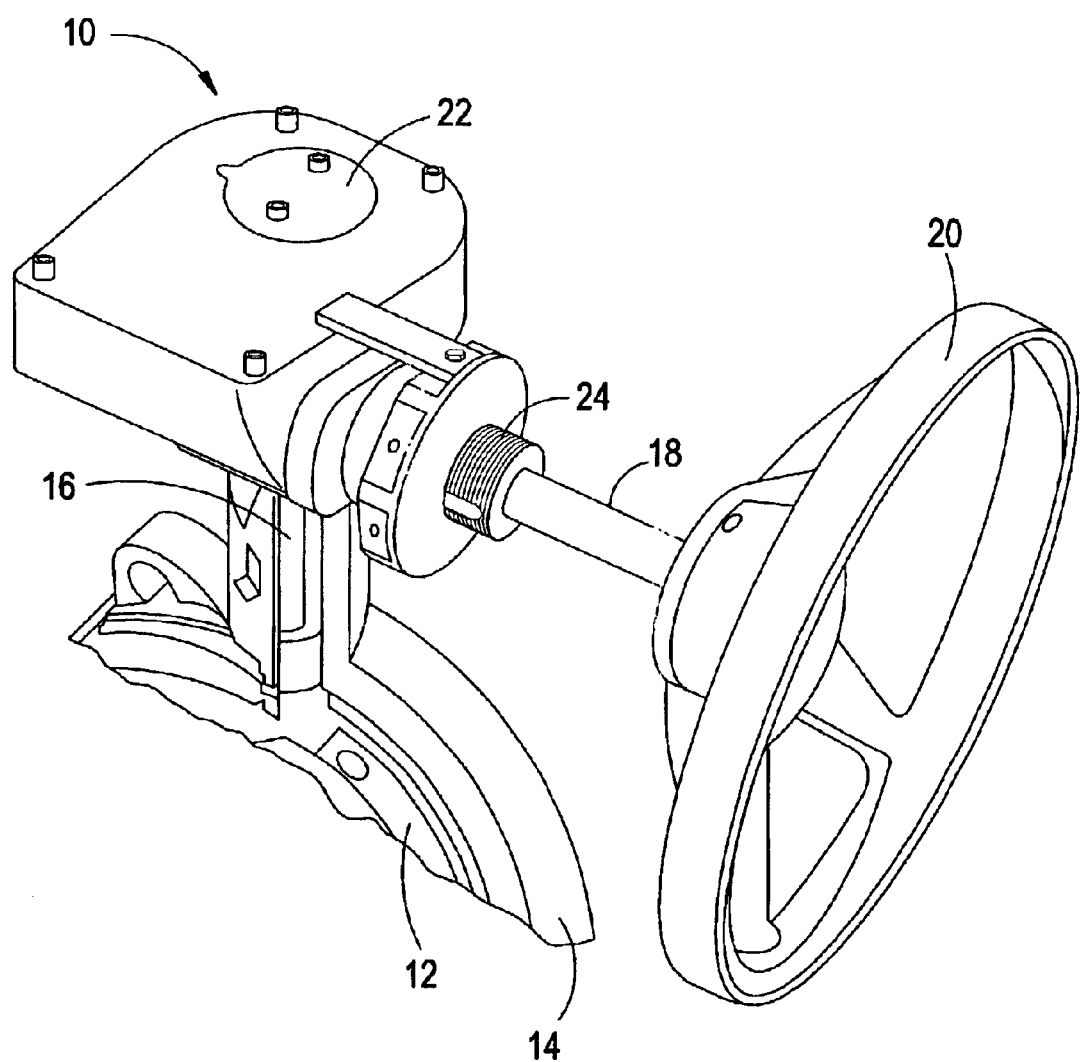
FIG. 1 is a perspective cut away view of a gear actuator mounted on a valve and having a stop arrangement according to the present invention.

FIG. 1 shows one typical use of a gear actuator 10 in a typical commercial application. The gear actuator 10 is used to rotate a valve element 12 within a valve body 14 via a rotating output shaft 16. An input shaft 18 is driven by a hand wheel 20. An indicator plate 22 is located outside of the housing of the gear actuator 10 and rotates with the output shaft 16.

Figure 2:
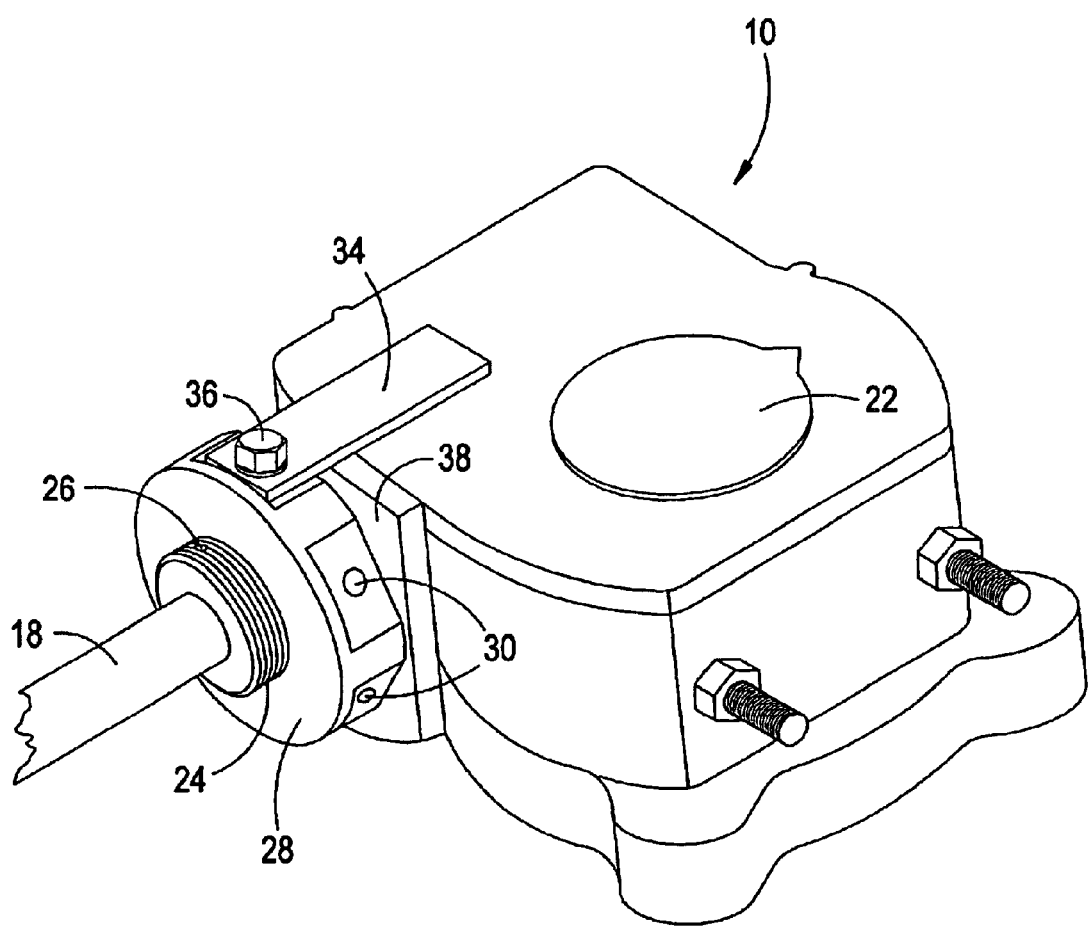
FIG. 2 is a perspective view of a gear actuator having a stop arrangement according to the present invention.
Figure 3:
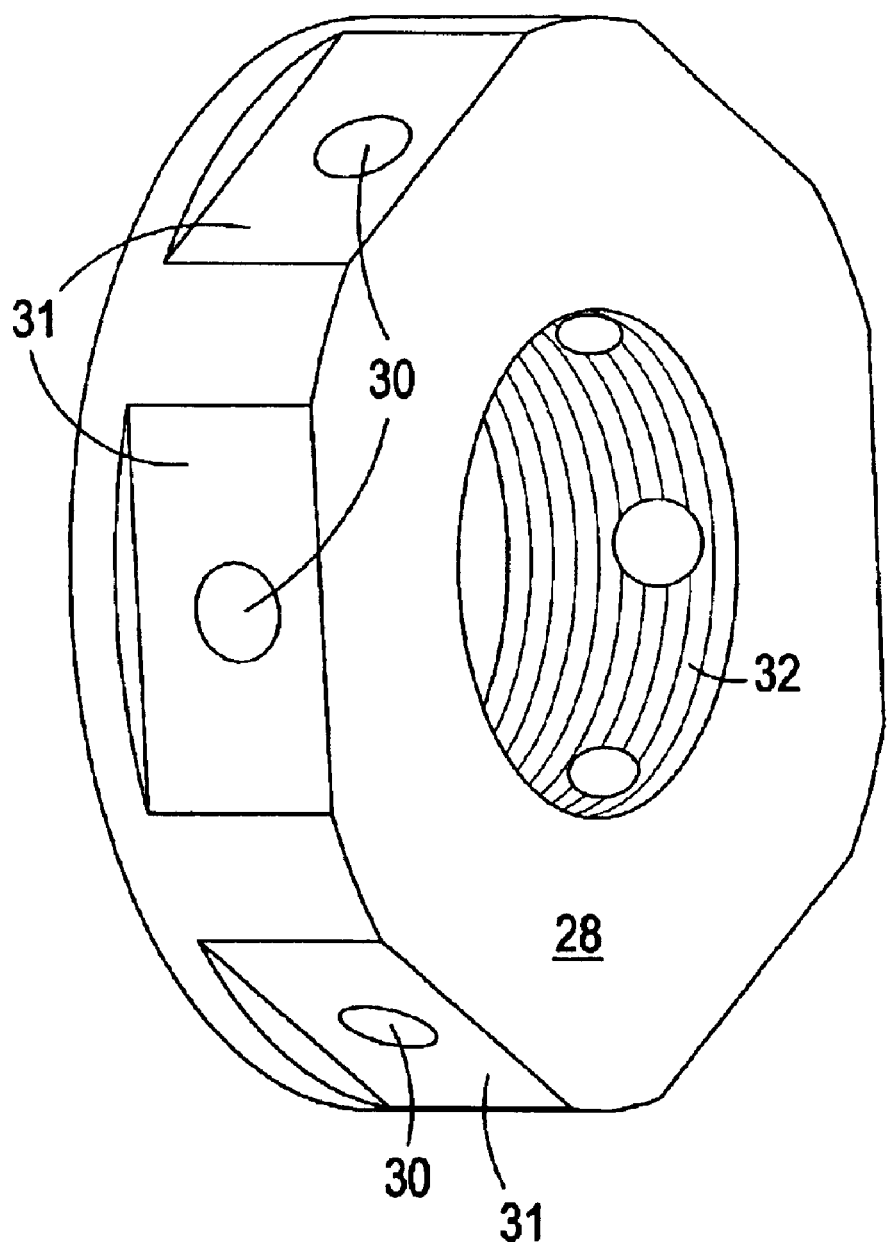
FIG. 3 is a perspective view of a stop nut used in the present invention.

In a preferred embodiment of the stop assembly and method, the input shaft 18 is provided with a stop screw portion 24 that rotates with the input shaft 18 and travelling stop nut 28 that is bolted to a stop guide 34. Turning now more particularly to FIG. 2, the stop screw 24 is a threaded cylinder that slides over the input shaft 18, and is fixed for rotation with the input shaft 18 via a pin 26 that extends through the stop screw 24 and into the input shaft 18.

The stop assembly of the present invention also utilizes a travelling stop nut 28, which is a nut that is threaded onto the stop screw 24, and that has several flat sides each having a mounting hole 30. The stop nut 28 has internal threads 32. The mounting hole 30 receives a bolt 36 that attaches a stop guide plate 34 to the stop nut 28 as shown.

In the configuration shown in FIG. 2, the stop guide 34 rests on top of the housing of the gear actuator 10 to prevent rotation of the stop nut 28 relative to the housing. However, the stop nut 28 can travel along the direction of the axis of the input shaft 18 via contact with the threads when the input shaft 18 is rotated. The stop nut 28 is thus free to travel in a direction away from a stop surface 38 of the housing when the input shaft 18 is rotated in a direction so that the stop nut 28 travels away from the housing. However, when the input shaft 18 is rotated in a direction that causes the stop nut 28 to travel towards the housing, at some point the stop nut 28 abuts against the stop surface 38 and further rotation of the input shaft 18 is then prevented.

A significant feature of the present invention is that the stop position beyond which the input shaft 18 cannot be turned is adjustable. In some embodiments, the stop nut 28 is positioned so that it will abut the stop surface 38 at a predetermined number of complete rotations and degrees of partial rotation of the input shaft 18, which will correspond to a specific rotary position of the output shaft 16 and valve element 12.

The adjustment of the stop position is accomplished by two aspects. First, when the stop guide 34 is disconnected from the stop nut 28, the stop nut can be rotated by a full turn around the stop screw 34. This will adjust the stop position by one full turn of the input shaft 18.

Another aspect is that further partial-turn adjustments are provided within the one full turn. In the illustrated embodiment, as seen particularly in FIG. 3, the stop nut 28 has six beveled surfaces 31 each having a mounting hole 30 for mounting of the stop guide 34. Thus, by positioning the stop nut 28 at a desired angle, and then mounting the stop guide 34, the stop position can be adjusted in increments of 60 degrees of rotation of the input shaft. Thus, the illustrated embodiment permits the stop position to be adjusted within 60 degrees of the input shaft 18 rotation.

For example, with a nut 28 having six mounting positions in approximately 60 degree increments, and with a gear actuator having ten input shaft rotations between fully opened and fully closed positions, a total of 60 incremental stop positions are provided between the fully opened and fully closed positions. For such a gear actuator that has 90 degrees of output gear rotation, 60 incremental stop positions are provided within the 90 degrees of output gear rotation, thus providing stop positions at approximately 1.5 degree output increments. In one preferred embodiment, the stop screw and stop nut have 1¾–12 threads. Of course, any suitable threading may be used.

In applications where the output shaft 16 is moving at a reduced speed compared to the input shaft 18, this can permit a relatively fine degree of positioning. Although having six beveled edges 31 and six mounting holes 30 is desirable in some preferred embodiments it will be appreciated that the number of mounting points and the angles between them may be varied as desired. Further, although in the preferred embodiment, the stop guide 34 is bolted via a bolt 36 into a hole 30 of the stop nut 28, other mechanical connections between the stop guide 34 and the stop nut 28 may be used if desired.

The operation of the stop assembly can preferably be as follows. First, a stop screw 24 can be pinned to the actuator input shaft 18 if it is not already so installed. Next, the travelling stop nut 28 can be threaded on the stop screw 24 with the output shaft being at the desired stop position. The stop nut 28 can be turned fully until it abuts with the stop surface 38. The nut 28 and input shaft 18 are now both in their stopped position, and the output shaft 16 and valve element 20 are also in the stop position. Next, the stop guide 34 can be bolted onto the appropriate surface of the stop nut 28.

The stop guide 34 will prevent rotation of the travelling stop nut 28 as the gear actuator 10 is operated throughout its normal range of actuator motion. As the valve is moved towards the closed position, the stop nut 28 will travel away from the stop surface 38. As the valve is moved back towards an open position, the stop nut 28 will move towards the stop surface 38 until it abuts the stop surface 38, at which point further opening of the valve is prevented.

Figure 4:
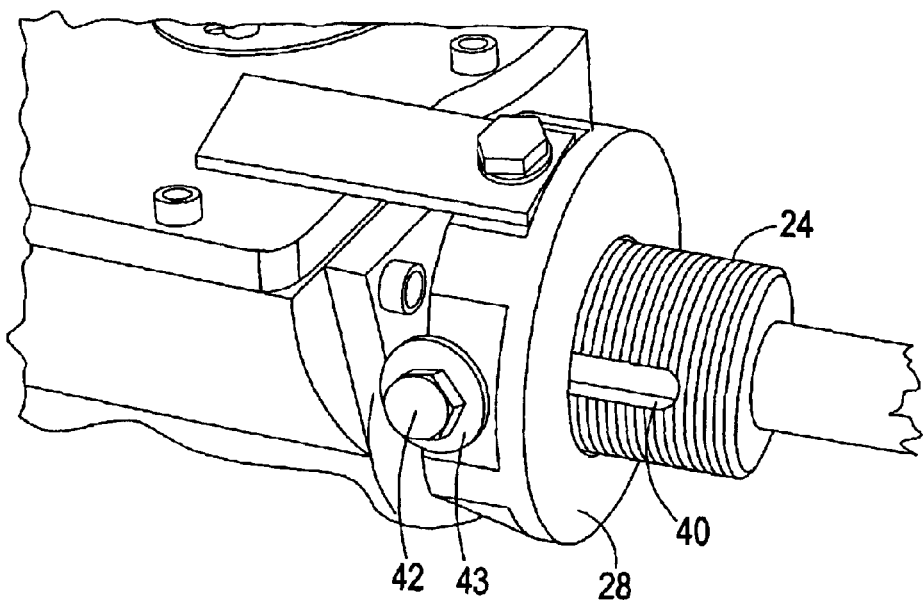
FIG. 4 is a perspective view illustrating an optional locking feature.
Figure 5:
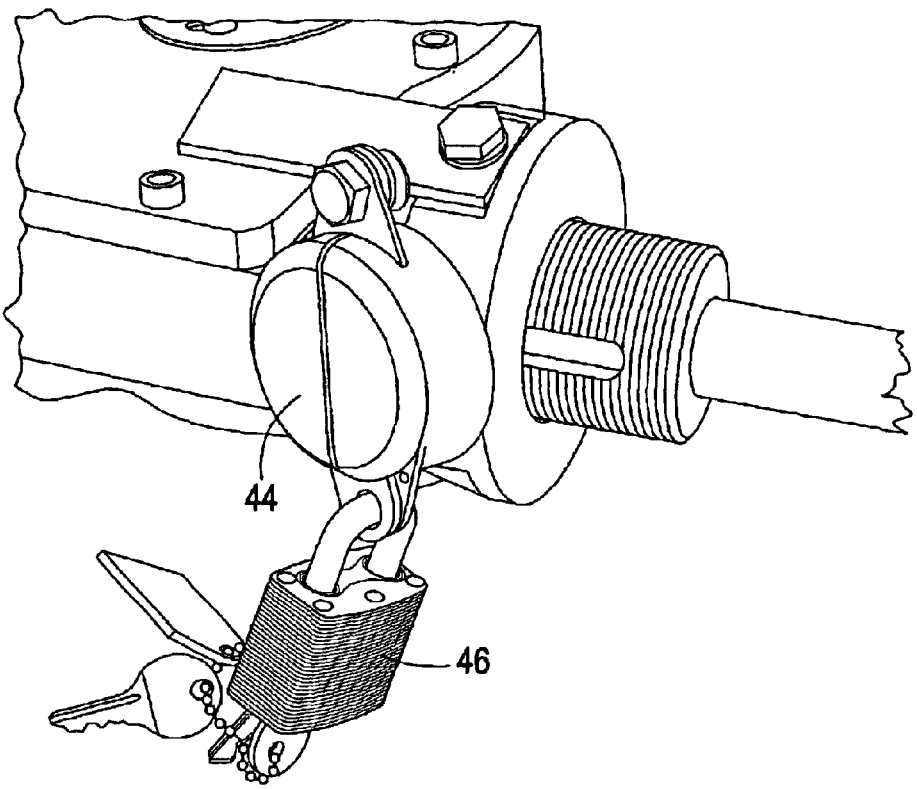
FIG. 5 is a perspective view illustrating the locking feature of FIG. 4 and further showing a lockout cover.

FIGS. 4 and 5 illustrate additional features that can be implemented with the present invention. In FIG. 4, a groove 40 is present on the stop screw 24 and a lock bolt 42 is threaded through one of the holes in the stop nut 28 so that it passes through the stop nut 28 and engages with the slot 40. This prevents relative rotation of the stop screw 24 with the stop nut 28, and thus locks the gear actuator against rotation. It will be appreciated that the use of a slot 40 and lock bolt 42 can be implemented as a safety device to prevent rotation of the gear actuator 10 and hence prevent undesired movement of the valve element. This arrangement also takes advantage of using the holes 30 which are already present in the stop nut 28, and using them for locking purposes as well as for attaching the stop guide 34.

A washer 43 may be used in conjunction with the lock bolt 42 to accept a two-part lockout cover 44 that may be installed over the head of the bolt 42 and secured with a lock such as a padlock 46 to prevent access to the lock bolt 42. This can provide additional security in locking the actuator 10.

A significant advantage of the present invention is that it can be retrofitted onto existing gear actuators. The stop screw 24 need only be slid over the existing input shaft 18 and fixed against rotation by a pin 26, which in some embodiments may simply frictionally tighten against the outside of the input shaft 18. The installation of the stop nut 28 and the stop guide 34 also do not require any modification of the actuator housing.

The illustrated embodiments are shown in FIG. 1 used with a rotary valve having a rotary valve member 12 attached to the gear actuator output shaft 16. However, the invention can also be used with valves having linear motion of the valve member, since the preferred embodiment is located at the input shaft. Further, the invention can be used on gear actuators for other material devices besides valves.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A stop apparatus for use with a gear actuator having an input shaft and an output shaft, comprising:
    a stop screw mounted to rotate with the input shaft;
    a stop nut mounted to threadably travel on the stop screw, wherein said stop nut has a plurality of beveled surfaces each having a mounting location, wherein each mounting location comprises a mounting hole; and
    a stop guide attached to the stop nut that prevents rotation of the stop nut relative to the gear actuator and permits longitudinal travel of the stop screw during rotation of the input shaft,
    wherein said stop guide is selectively mountable to said stop nut at each of the mounting locations.

2. The apparatus according to claim 1, wherein the gear actuator has a stop surface and the stop nut abuts the stop surface upon a predetermined amount of rotations of the input shaft.

3. The apparatus according to claim 1, wherein the stop guide is removably attachable to the stop nut at more than one radial circumferential location on the stop nut.

4. An apparatus according to claim 1, wherein the number of mounting locations is at least six.

5. An apparatus according to claim 1, wherein the mounting locations comprise a mounting hole, and the stop guide is selectively mountable to the stop nut via a bolt attached to the mounting hole.

6. An apparatus according to claim 5, wherein the mounting locations each further comprise a stop guide engaging surface adapted to engage the stop guide.

7. An apparatus according to claim 1, wherein the stop guide engages the gear actuator by sliding along a surface of the gear actuator in the direction of travel.

8. An apparatus according to claim 1, wherein the stop screw has a slot disposed thereon in the axial direction.

9. An apparatus according to claim 8, wherein a lock bolt is mounted through the stop nut to engage the slot and prevent rotation of the stop screw relative to the stop nut.

10. An apparatus according to claim 9, further comprising a cover for selectively preventing access to the lock bolt.

11. An apparatus according to claim 1, wherein the output shaft is connected to a moveable valve member in a valve body.

12. An apparatus according to claim 11, wherein the valve member is rotatable in the valve body.

13. A stop apparatus for use with a gear actuator having an input shaft and an output shaft, comprising:
    first engaging means mounted to rotate with the input shaft;
    second engaging means mounted for engaging the first engaging means and traveling on the first engaging means, wherein said second engaging means has a plurality of beveled surfaces each having a mounting location, wherein each mounting location comprises a mounting hole; and
    guiding means attached to the second engaging means for guiding the second engaging means and that prevents rotation of second engaging means relative to the gear actuator and permits longitudinal travel of the first engaging means during rotation of the input shafts,
    wherein said guiding means is selectively mountable to said second engaging means at each of the mounting locations.

14. A stop apparatus according to claim 13, wherein the first engaging means and the second engaging means are both threaded.

15. A stop apparatus according to claim 13, further comprising a blocking means for blocking travel of the second engaging and traveling means.

16. A stop apparatus according to claim 15, wherein the blocking means abuts the second engaging and traveling means to block the travel thereof.

* * * * *